United States Patent
Zachau et al.

[11] Patent Number: 6,045,721
[45] Date of Patent: Apr. 4, 2000

[54] BARIUM MAGNESIUM ALUMINATE PHOSPHOR

[75] Inventors: Martin Zachau, Geltendorf; Dieter Schmidt; Ulrich Mueller, both of Munich, all of Germany; Charles F. Chenot, Towanda, Pa.

[73] Assignee: Patent-Treuhand-Gesellschaft fur Elekrische Gluhlampen mbH, Munich, Germany

[21] Appl. No.: 08/996,926

[22] Filed: Dec. 23, 1997

[51] Int. Cl.$^7$ .......................... C09K 11/64; C09K 11/57; C09K 11/55; H01J 1/62

[52] U.S. Cl. .................... 252/301.4 R; 313/582; 313/587; 313/584; 313/484; 313/485; 313/486; 313/487; 313/493; 313/492; 313/634; 313/635; 313/643

[58] Field of Search ............... 252/501.4 R; 313/582, 313/587, 484, 485, 486, 487, 493, 492, 639, 635, 643

[56] References Cited

U.S. PATENT DOCUMENTS

| | | | |
|---|---|---|---|
| 4,032,812 | 6/1977 | Kobayashi et al. | 313/487 |
| 4,216,408 | 8/1980 | Verstegen et al. | 313/468 |
| 4,733,126 | 3/1988 | Yamakawa et al. | 313/487 |
| 5,714,835 | 2/1998 | Zachau et al. | 252/301.4 R |
| 5,879,586 | 3/1999 | Kitamura et al. | 252/301.4 R |

*Primary Examiner*—C. Melissa Koslow
*Attorney, Agent, or Firm*—Robert F. Clark

[57] ABSTRACT

A barium magnesium aluminate phosphor having improved maintenance and efficiency is provided. The novel phosphor is suitable for use in conventional fluorescent lamp applications and applications utilizing VUV excitation, including Xe excimer lamps and plasma display panels.

23 Claims, 3 Drawing Sheets

BARIUM MAGNESIUM ALUMINATE PHOSPHOR

FIELD OF THE INVENTION

The present invention relates to a barium magnesium aluminate phosphor as well as to corresponding phosphor blends, lamps and displays comprising said phosphor.

BACKGROUND ART

Barium magnesium aluminate phosphors are known and widely used as blue-emitting phosphors, especially for trib- and white fluorescent lamps. This is due to the relatively high quantum efficiency and the appropriate spectral distribution of barium magnesium aluminate phosphors. A basic disclosure of barium magnesium aluminate phosphors can be found in U.S. Pat. No. 4,216,408.

An important disadvantage of barium magnesium aluminate phosphors is, however, the insufficient stability over the time of operation, especially in case of excitation with VUV radiation with a wavelength below 200nm. This insufficient stability or maintenance results in a deterioration of quantum efficiency as well as in a shift of the emission spectrum. Consequently, phosphor blends and lamps employing conventional barium magnesium aluminate phosphors show a colour shift to green with longer operation times. This problem is the more severe the larger the fraction of barium magnesium aluminate phosphor in the blend, i.e. the higher the correlated colour temperature. Such higher colour temperatures, however, are typical for displays and display illumination systems.

SUMMARY OF THE INVENTION

In view of the above described problems of conventional barium magnesium aluminate phosphors, the present invention intends to improve the efficiency, stability and maintenance of barium magnesium aluminate phosphors.

Consequently, a first aim of the invention is to define an improved barium magnesium aluminate phosphor in view of efficiency, stability and maintenance, a second aim is to provide accordingly improved phosphor blends for typical applications, a third aim is to provide an improved lamp and an improved display based on the phosphor according to the invention, and finally a fourth aim is to provide a novel production method for the phosphor of the invention.

According to the invention, these aims are achieved by means of a phosphor represented by the formula:

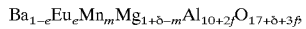

wherein $0 \leq e \leq 0.4$;

$0 \leq m \leq 0.3$;

$0.01 \leq \delta \leq 0.1$;

$0 \leq f \leq 1$; and $e+m>0$,

Further, the aims of the invention are achieved by means of a phosphor blend comprising said phosphor, a red phosphor and a green phosphor and, more particularly, a phosphor blend wherein the weight percentage of said phosphor is 5% to 40%, the weight percentage of said red-emitting phosphor is 10% to 50% and the weight percentage of said green emitting phosphor is 30% to 70%.

In another aspect, the aims of the invention are achieved by means of a phosphor blend comprising said phosphor and a yellow phosphor and more particularly, wherein the weight percentage of said phosphor is 50% to 95% and the weight percentage of said yellow-emitting phosphor is 5% to 50%.

In yet another aspect, there is provided a fluorescent lamp containing said phosphor and, more particularly, a fluorescent lamp wherein the phosphor is excited with VUV radiation having a wavelength below 200 nm, including a Xe excimer fluorescent lamp.

In still another aspect, there is provide a plasma display panel containing the phosphor.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

The phosphor according to this invention (hereinafter referred to as BAM-VUV) is represented by the formula:

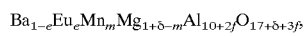

wherein:

0; 0.05; 0.1; $0.15 \leq e \leq 0.2$; 0.25; 0.3; 0.4;

0; $0.05 \leq m \leq 0.1$; 0.2; 0.3;

0.01; 0.015; 0.02; 0.025; $0.03 \leq \delta \leq 0.04$; 0.05; 0.06; 0.07; 0.08; 0.09; 0.1;

0, 0.1, $0.2 \leq f \leq 0.3$; 0.4; 0.5; 0.7; 1; and $e+m>0$.

With regard to the variable ranges, the higher the lower limit or the lower the upper limit, the more preferred these values are, respectively, except for the lower limit of f, which is the more preferred the lower its value. The upper and lower limits for each variable are independent from each other, e.g., the condition 0; $0.05 \leq m \leq 0.1$; 0.2; 0.3 describes six ranges for the variable m: $0 \leq m \leq 0.1$; $0 \leq m \leq 0.2$; $0 \leq m \leq 0.3$; $0.05 \leq m \leq 0.1$; $0.05 \leq m \leq 0.2$; and $0.05 \leq m \leq 0.3$. Although the invention relates both to Eu and Mn as activating elements, the incorporation of Mn is of interest, mainly in view of the differences in the colour point of the resulting phosphor. A particular condition of interest is when $0.15 \leq e \leq 0.2$ and $m \leq 0.02$. It is to be noted that the condition $e=m=0$ is excluded because the phosphor needs at least one activating element.

The phosphor according to the invention is characterized by a Mg content which is higher than required by conventional stoichiometry, $BaMgAl_{10}O_{17}:Eu,Mn$. This extra Mg content is given by the parameter $\delta$, which also appears in the concentration of O since Mg is usually added as MgO in the phosphor formulation. Because of the excess Mg, the sum of the contents of Mg and Mn should be somewhat higher than the sum of the contents of Ba and Eu. The optimum range for δ is observed between 0.03 and 0.04 and the optimum range for e is between 0.15 and 0.2. The phosphor is further characterized in that it shows an X-ray diffraction peak at Miller index 008 which is separate from the peak at Miller index 110 (or at least contains a crystalline compound showing such a peak).

Figure 1:
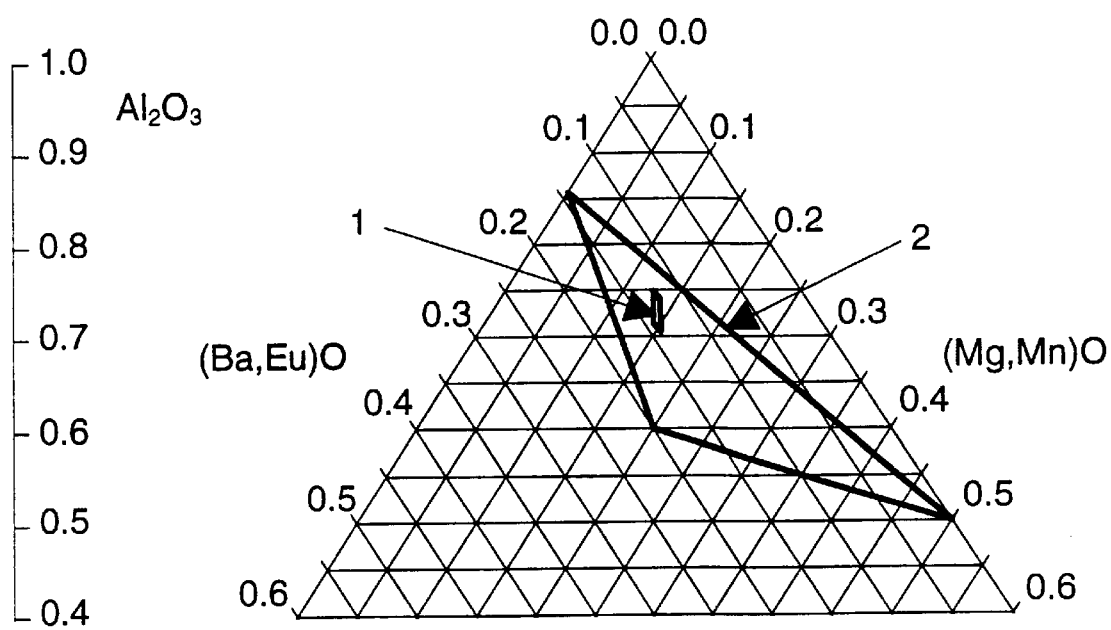
FIG. 1 shows the barium magnesium aluminate concentration range covered by the present invention in comparison to the range of the above cited prior art.

The triangular diagram in FIG. 1 gives the contents of (Ba,Eu)O in $Ba_{1-e}Eu_eMn_mMg_{1+\delta-m}Al_{10+2f}O_{17+\delta+3f}$ by means of the upper left side axis of the triangle whereas the upper right side axis gives the content of (Mg,Mn)O (because Eu substitutes for Ba and Mn substitutes for Mg). Both axes mean zero contents at the top and a value of 60% at the bottom. Accordingly, the content of $Al_2O_3$ appears as a vertical axis—shown outside of the triangle at the left side for clarity—starting with 40% at the bottom and ending up with 100% at the top.

In comparing this figure with the above formula, $Ba_{1-e}Eu_eMn_mMg_{1+\delta-m}Al_{10+2f}O_{17+\delta+3f}$, it has to be noted that a different normalization is used. In FIG. 1, the sum of all concentrations is always 1 whereas in the formula the value of (Ba,Eu)O is always 1 and the value of (Mg,Mn)O is always 1+δ.

The small parallelogram assigned with reference numeral 1 shows the range of phosphors according to this invention and, for comparison, the large triangular range corresponds to the phosphors according to U.S. Pat. No. 4,216,408. It is clear from this figure that the invention relates to a relatively very small area part, which was found to be of surprisingly better properties than the area around, of the predescribed phosphor range. The combination of more preferred parameter limits, e.g., for δ and f, would correspond to excising an even smaller corner parallelogram out of the parallelogram shown in FIG. 1.

The BAM-VUV phosphor shows improvements in the maintenance of the luminous intensity and spectral characteristics. Further, the invention provides for an improved luminous intensity at the beginning of the operation life as well as an improved blue efficency. This blue efficiency is defined as:

$$\eta_z = \eta z/y$$

where η is the luminous efficiency weighed by the spectral sensitivity of the human eye $V_{(\lambda)}$, and x, y and z are the standard colour coordinates. This improvement in blue efficiency relates both to the blue efficiency at the beginning of operation life as well as to its maintenance during operation time.

Figure 2:
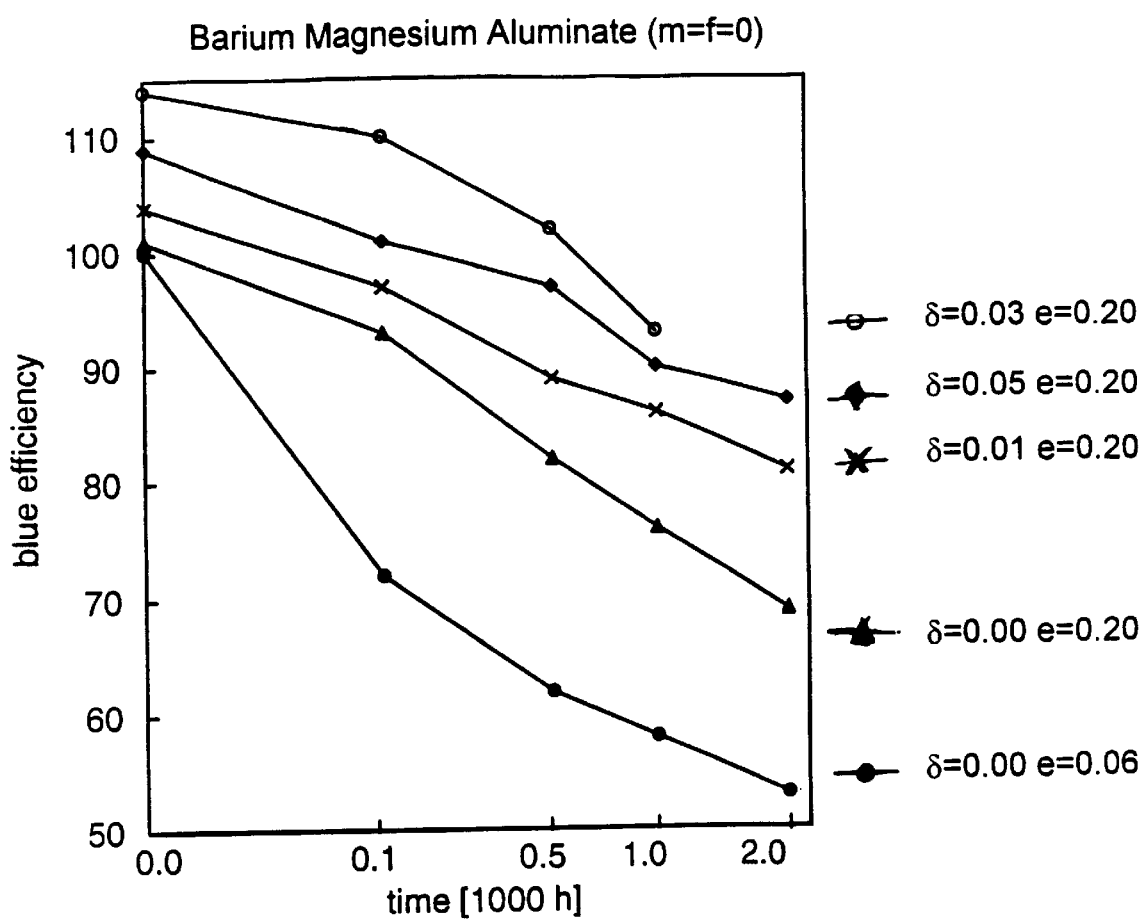
FIG. 2 shows the effect of the invention in terms of the blue efficiency maintenance versus operation time of $Ba_{1-e}Eu_eMn_mMg_{1+\delta-m}Al_{10+2f}O_{17+\delta+3f}$ for different values of $\delta$ and a preferred value of e in comparison to a conventional example.

From FIG. 2, it can be seen that a value of δ=0.03 with e=0.2 (here and in the following m=f=0) yields the best starting blue efficiency. Further, the maintenance characteristics are comparable to δ=0.01 and δ=0.05. They are also much better than the conventional examples with δ=0 of which the one with lower e value of 0.06 is a typical production phosphor and even worse.

Figure 3:
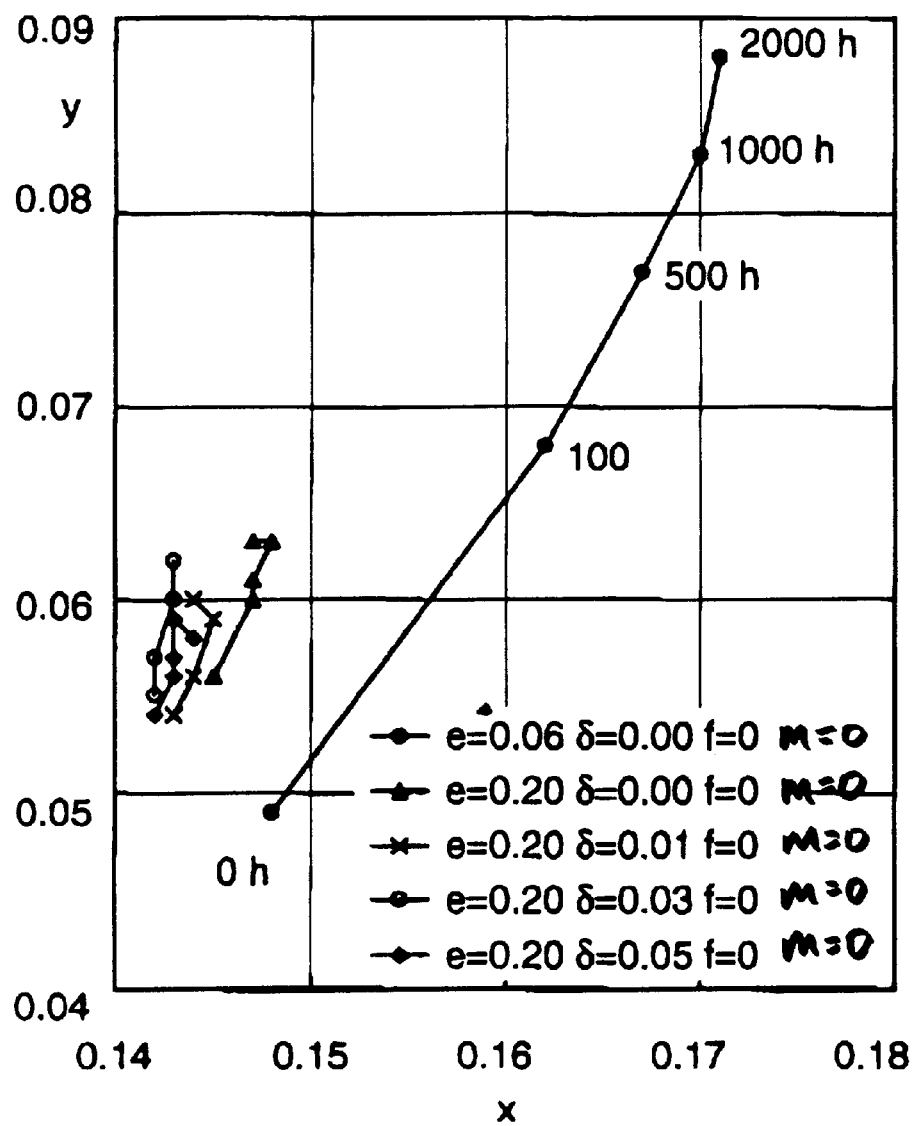
FIG. 3 shows the effect of the invention for the same different values of $\delta$ and the same preferred value of e in terms of the shift of the colour point versus operation time in comparison to a conventional example.

On the other hand, in FIG. 3, the shift of the colour point is quite low for all phosphors of the invention with δ=0.01, δ=0.03 and δ=0.05 and in all three cases comparable with or even better than the conventional $Ba_{1-e}Eu_eMn_mMg_{1+\delta-m}Al_{10+2f}O_{17+\delta+3f}$ with δ=0 and high e=0.2. The conventional example with e=0.06 shows a very serious colour shift.

It can be seen that the invention allows a strong improvement in the blue efficiency as regards its starting value and its maintenance with simultaneous reduction of the colour shift phenomenon. In conclusion, δ=0.03 appears as a very good value from these results.

The improvements and effects of the invention can be maximized by choosing a high value for e, i.e., a high Eu content. However, the addition of Eu is expensive. Therefore, it is preferred to increase the Eu content only to the amount required for the individual application. In any case, the invention's improvements of the increased Mg content relate to low as well as to high e values.

The above described BAM-VUV phosphor is preferably produced by choosing an annealing temperature between 1400° C. and 1700° C. More preferred values for the lower and upper limits are 1500° C., 1530° C., 1550° C. and 1660° C., 1630° C., 1610° C., respectively. For the embodiments, a relatively high annealing temperature of 1580° C. was used. The experimental results confirmed the importance of annealing temperatures in the already defined range and 1580° C. was the best value. It is to be added that the remaining details of the production process as such are conventional and known to the technical expert. Such a process is described in U.S. Pat. No. 4,216,408.

The BAM-VUV phosphor can be used in a phosphor blend comprising the above described phosphor and further a red and a green-emitting phosphor. Preferably, the red and green-emitting phosphors are $(Y,Gd)BO_3$:Eu and $LaPO_4$:Ce,Tb, respectively. This phosphor blend is especially appropriate for Xe excimer lamps and plasma display panels with high colour temperature. Preferably, the content of BAM-VUV phosphor is 5% to 40%, the content of $(Y,Gd)BO_3$:Eu is 10% to 50% and the content of $LaPO_4$:Ce,Tb is 30% to 70%, in weight percentages respectively.

Another preferred phosphor blend contains a yellow-emitting phosphor besides the above blue-emitting BAM-VUV phosphor. This yellow phosphor is preferably $Y_3Al_5O_{12}$:Ce in a preferred weight percentage of 5% to 50% whereas the weight percentage of BAM-VUV phosphor is preferably 50% to 95%.

More particularly, the phosphors described in the above blends have the following preferred compositions:

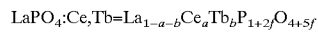

$$LaPO_4:Ce,Tb = La_{1-a-b}Ce_aTb_bP_{1+2f}O_{4+5f} \qquad 1.$$

wherein:

0; 0.1; 0.15≦a≦0.3; 0.4; 0.6;

0.05≦b≦0.2; 0.3; 0.5;

a+b≦1;

0≦f≦≦0.1;

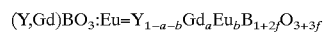

$$(Y,Gd)BO_3:Eu = Y_{1-a-b}Gd_aEu_bB_{1+2f}O_{3+3f} \qquad 2.$$

wherein:

0≦a≦0.25; 0.5;0.99;

0.01; 0.03; 0.05≦b≦0.15; 0.2; 0.3;

a+b≦1;

0≦f≦0.2.

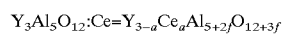

$$Y_3Al_5O_{12}:Ce = Y_{3-a}Ce_aAl_{5+2f}O_{12+3f} \qquad 3.$$

wherein:

0.01; 0.05≦a≦0.15; 0.3; 0.5;

0≦f≦0.5.

Table 1 presents typical results for the colour shift of triband white blends obtained with a conventional $BaMgAl_{10}O_{17}$:Eu,Mn phosphor and with a phosphor according to the preferred features of the invention. Therein the abbreviations mean:

BAM=BaMgAl$_{10}$O$_{17}$:Eu,Mn (conventional)
LAP=LaPO$_4$:Ce,Tb
YOB=(Y,Gd)BO$_3$:Eu.

The colour points at the beginning and at the end of a 100 h operation time are shown. The differences therebetween are given in the right column. Comparing the upper three (conventional) examples with the lower three (of the invention) illustrates the strong improvements of the invention in terms of typical phosphor blends.

TABLE 1

Examples for Triband White Blends with BAM and BAM-VUV

| Blend No. | Green Comp. LAP [%] | Red Comp. YOB [%] | Blue Comp. BAM [%] | Color Point 0 h x | y | Color Point 100 h x | y | Color Shift 0–100 h dx | dy |
|---|---|---|---|---|---|---|---|---|---|
| M6 | 48 | 33.5 | 16.5 | 0.363 | 0.332 | 0.388 | 0.36 | +0.025 | +0.028 |
| M8 | 57.4 | 24.6 | 18 | 0.329 | 0.342 | 0.35 | 0.37 | +0.021 | +0.028 |
| M11 | 54 | 21.5 | 23.5 | 0.313 | 0.311 | 0.333 | 0.334 | +0.020 | +0.023 |

| Blend No. | Green Comp. LAP [%] | Red Comp. YOB [%] | Blue Comp. BAM-VUV [%] | Color Point 0 h x | y | Color Point 100 h x | y | Color Shift 0–100 h dx | dy |
|---|---|---|---|---|---|---|---|---|---|
| M11a | 54 | 21.5 | 24.5 | 0.347 | 0.365 | 0.35 | 0.365 | +0.003 | +0.000 |
| M14 | 49.4 | 20.6 | 30 | 0.318 | 0.322 | 0.323 | 0.325 | +0.005 | +0.003 |
| M16 | 49.4 | 19 | 31.5 | 0.317 | 0.327 | 0.32 | 0.33 | +0.003 | +0.003 |
| M13a | 45.2 | 18.8 | 36 | 0.298 | 0.295 | 0.303 | 0.298 | +0.005 | +0.003 |

Because of the improved maintenance and efficiency provided by the BAM-VUV phosphor of this invention, it is now feasible to use barium magnesium aluminate type phosphors in applications involving VUV excitation. A preferred choice for such a lamp is a silent discharge lamp, preferably a Xe excimer lamp, incorporating this phosphor or a phosphor blend according to the invention. Examples of such VUV applications can be found in the following references whose disclosures are incorporated herein by reference:

WO 94/23442 relates to a basic operation process for a silent discharge which can be used for a Xe excimer lamp.

WO 97/04625 relates to an operation method as well as to a special structure for such a lamp enabling the lamp to be very flat and covering a large area in an easy way.

Concerning the displays and plasma display panels of the invention, their technology as such is known. However, according to the invention, novel phosphors and phosphor blends are provided which show strong improvements in the blue efficiency and the maintenance of the blue efficiency as well as in terms of the colour shift. All these properties are of special importance for display lamps and plasma display panels as already mentioned above. Therefore, the invention also relates to displays and plasma display panels being characterized in containing a phosphor according to the invention.

The construction of such displays is state of the art; e.g., reference is made to the following publications which are incorporated herein by reference:

P. S. Friedman, "Are Plasma Display Panels a Low-Cost Technology?", Information Display Vol. 11, No. 10 (1995), 22–25, and further to J.-P. Boeuf, H. Doyeaux, "Simulating Large-Area Plasma Displays", Europhysics News Vol. 27, No. 2 (1996), 46–49.

While there has been shown and described what are at the present considered the preferred embodiments of the invention, it will be obvious to those skilled in the art that various changes and modifications may be made therein without departing from the scope of the invention as defined by the appended claims.

What is claimed is:

1. A phosphor represented by the formula:

$$Ba_{1-e}Eu_eMn_mMg_{1+\delta-m}Al_{10+2f}O_{17+\delta+3f}$$

wherein
 $0 \leq e \leq 0.4$;
 $0 \leq m \leq 0.3$;
 $0.01 \leq \delta \leq 0.1$;
 $0 \leq f \leq 1$; and
 $e+m > 0$.

2. A phosphor according to claim 1, wherein $0.03 \leq \delta \leq 0.04$.

3. A phosphor according to claim 1 wherein $0.15 \leq e \leq 0.2$.

4. A phosphor according to claim 3 wherein $m \leq 0.02$.

5. A phosphor according to claim 3 wherein $0.03 \leq \delta \leq 0.04$.

6. A phosphor according to claim 1 wherein $0.05 \leq m \leq 0.1$.

7. A phosphor according to claim 6 wherein $0.15 \leq e \leq 0.2$.

8. A phosphor according to claim 7 wherein $0.03 \leq \delta \leq 0.04$.

9. A phosphor claim 1 wherein $0 \leq f \leq 0.3$.

10. A phosphor according to claim 9 wherein $0.15 \leq e \leq 0.2$ and $0.03 \leq \delta \leq 0.04$.

11. A phosphor according to claim 1 further comprising a crystalline compound showing an X-ray diffraction peak at Miller index 008 which separate from the peak at Miller index 110.

12. A phosphor blend comprising a red-emitting phosphor, a green-emitting phosphor and a third phosphor represented by the formula:

$$Ba_{1-e}Eu_eMn_mMg_{1+\delta-m}Al_{10+2f}O_{17+\delta+3f},$$

wherein
 $0 \leq e \leq 0.4$;
 $0 \leq m \leq 0.3$;
 $0.01 \leq \delta \leq 0.1$;
 $0 \leq f \leq 1$; and
 $e+m > 0$.

13. A phosphor blend according to claim 12 wherein the third phosphor has a europium content of $0.15 \leq e \leq 0.2$;
 said red-emitting phosphor is $Y_{1-a-b}Gd_aEu_bB_{1+2f}O_{3+3f}$
  wherein:

$0 \leq a \leq 0.99$;
$0.01 \leq b \leq 0.3$;
$a+b \leq 1$
$0 \leq f \leq 0.2$; and,
said green-emitting phosphor is $La_{1-a-b}Ce_aTb_bP_{1+2f}O_{4+5f}$ wherein:
$0 \leq a \leq 0.6$;
$0.05 \leq b \leq 0.5$;
$a+b \leq 1$:
$0 \leq f \leq 0.1$.

14. A phosphor blend according to claim 13, wherein the weight percentage of said third phosphor is 5% to 40%, the weight percentage of said red-emitting phosphor is 10% to 50% and the weight percentage of said green-emitting phosphor is 30% to 70%.

15. A phosphor blend comprising a yellow-emitting phosphor and a second phosphor represented by the formula:

$$Ba_{1-e}Eu_eMn_mMg_{1+\delta-m}Al_{10+2f}O_{17+\delta+3f}$$

wherein
$0 \leq e \leq 0.4$;
$0 \leq m \leq 0.3$;
$0.01 \leq \delta \leq 0.1$;
$0 \leq f \leq 1$; and
$e+m>0$.

16. A phosphor blend according to claim 15, wherein said yellow-emitting phosphor is $Y_{3-a}Ce_aAl_{5+2f}O_{12+3f}$ wherein:
$0.01 \leq a \leq 0.5$; and
$0 \leq f \leq 0.5$ 17. A phosphor blend according to claim 16, wherein the weight percentage of said second phosphor is 50% to 95% and the weight percentage of said yellow-emitting phosphor is 5% to 50%.

18. A fluorescent lamp containing a phosphor represented by the formula:

$$Ba_{1-e}Eu_eMn_mMg_{1+\delta-m}Al_{10+2f}O_{17+\delta+3f}$$

wherein
$0 \leq e \leq 0.4$;
$0 \leq m \leq 0.3$;
$0.01 \leq \delta \leq 0.1$;
$0 \leq f \leq 1$; and
$e+m>0$.

19. A fluorescent lamp according to claim 18 wherein the phosphor is excited with VUV radiation having a wavelength below 200 nm.

20. A fluorescent lamp according to claim 19 wherein the fluorescent lamp is a Xe excimer fluorescent lamp.

21. A plasma display panel containing a phosphor represented by the formula:

$$Ba_{1-e}Eu_eMn_mMg_{1+\delta-m}Al_{10+2f}O_{17+\delta+3f}$$

wherein
$0 \leq e \leq 0.4$;
$0 \leq m \leq 0.3$;
$0.01 \leq \delta \leq 0.1$;
$0 \leq f \leq 1$; and
$e+m>0$.

22. A method for producing the phosphor of claim 1 including an annealing step with an annealing temperature between 1400° C. and 1700° C.

23. A method according to claim 22, wherein said annealing temperature is 1580±30° C.

* * * * *